March 15, 1955  K. J. GREIF  2,704,007
LIQUID DENSITY MEASURING ATTACHMENT
FOR PHOTOELECTRIC DENSITOMETERS
Filed April 4, 1950  2 Sheets-Sheet 1

INVENTOR
KARL J. GREIF
BY
ATTORNEYS

March 15, 1955 K. J. GREIF 2,704,007
LIQUID DENSITY MEASURING ATTACHMENT
FOR PHOTOELECTRIC DENSITOMETERS
Filed April 4, 1950 2 Sheets-Sheet 2
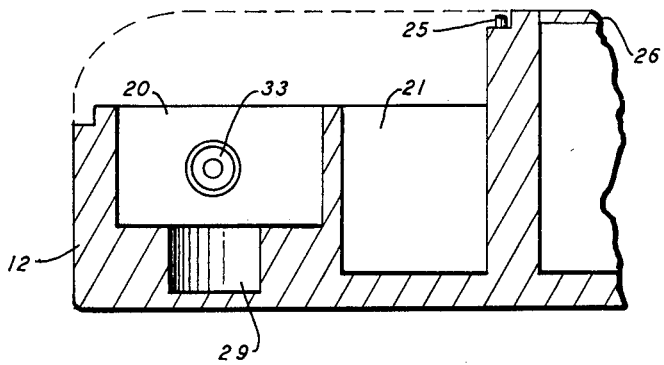
Fig. 6
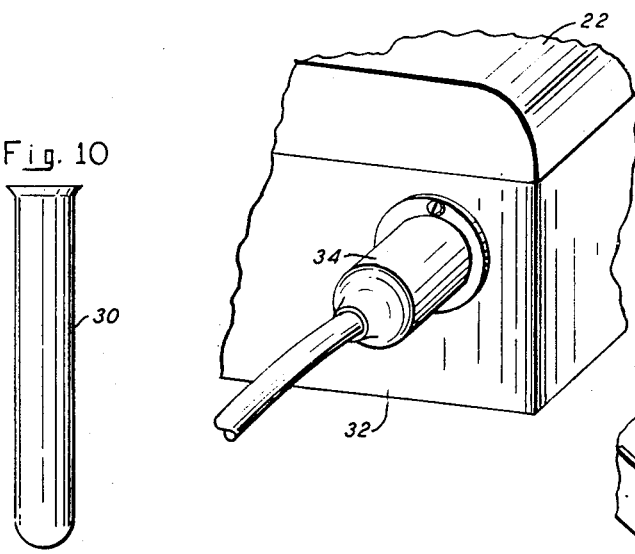
Fig. 10
Fig. 7
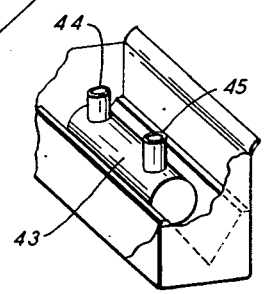
Fig. 9
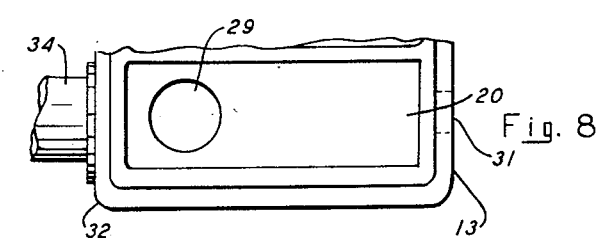
Fig. 8
INVENTOR
KARL J. GREIF
ATTORNEYS

United States Patent Office 2,704,007
Patented Mar. 15, 1955

2,704,007

LIQUID DENSITY MEASURING ATTACHMENT FOR PHOTOELECTRIC DENSITOMETERS

Karl J. Greif, Hillcrest, N. Y., assignor to General Aniline & Film Corporation, New York, N. Y., a corporation of Delaware Application April 4, 1950, Serial No. 153,785

3 Claims. (Cl. 88—14)

This invention relates to density measuring apparatus, and more particularly to accessory devices to be used in conjunction with densitometers for measuring the optical density of liquid specimens.

In the evaluation of photographic densities, use is made of photoelectric indicating instruments which receive light through the specimen material, such as film negatives or positive transparencies. A particular type of instrument which finds wide use for such measurements, described in United States Patent 2,406,716, employs a removable hinged arm housing a photoelectric tube and cooperates with a platform or table on which the specimen is placed. This arm provides a light sealed enclosure as well as electric shielding for the phototube. A small aperture in the arm which rests over the specimen permits light to enter and energize the phototube.

It is often desirable to measure the optical density of liquid samples. In densitometers of the above type, liquid specimens cannot be accommodated, and if placed over the platform in narrow flat containers through which light must pass in a vertical direction, air bubbles are apt to accumulate introducing inaccuracies. Moreover, the volume in such vessels is generally insufficient for liquids possessing high translucencies.

It is the primary object of this invention to extend the usefulness of densitometers of the type mentioned to optical density measurements of liquids, and, to this end, an accessory apparatus is provided in the form of a liquid density measuring attachment.

Another object of the invention is to provide such an attachment in a compact and simple form which can readily be used in connection with such densitometers.

A particular feature of this invention is that the attachment for liquid density evaluations accommodates various types of containers and accessories in a simple and compact form.

Another feature of the invention is that measurement of liquid densities can be quickly and accurately effected by virtue of the fact that the attachment accommodates the hinged arm of the aforementioned type densitometer and presents easy accessibility to various accessories which may be used therewith.

Other objects and features will be apparent from the following description of the invention, pointed out in particularity in the appended claims, and taken in connection with the accompanying drawings, in which:

Figure 6 is a sectional view of the liquid density attachment taken along lines 6—6 of Figure 1;

Figure 7 is a partial view in perspective of the side of the attachment for the mounting of the light socket;

Figure 8 is a top view of the specimen compartment;

Figure 9 shows in perspective the cuvette resting in the trough of the holder. The latter is broken away in parts to gain a clearer view; and Figure 10 illustrates a test tube which may be accommodated in the specimen compartment.

Figure 1:
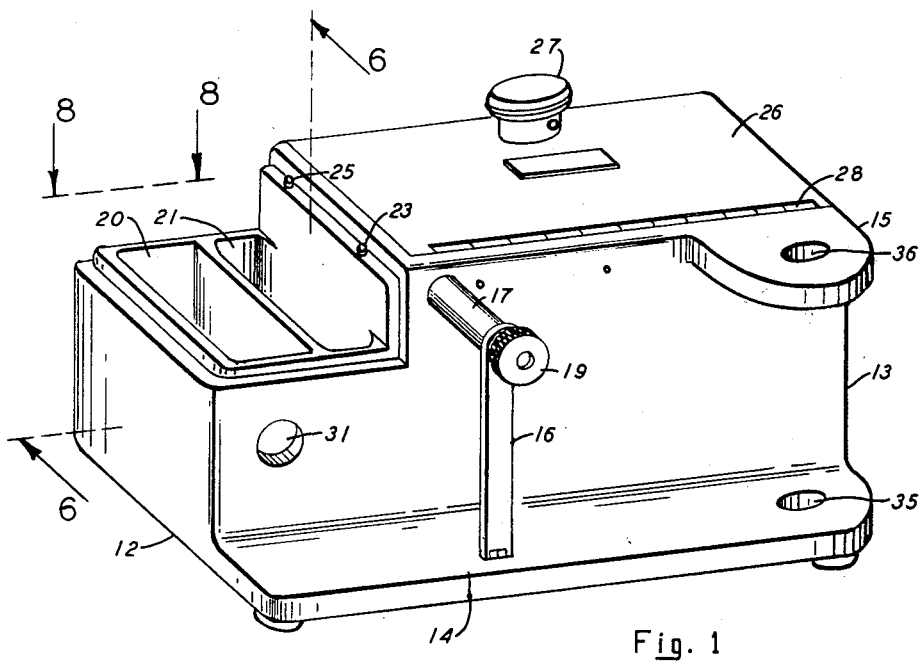
Figure 1 is a side elevational view in perspective of the liquid density attachment with the cover removed from the specimen compartment.
Figure 2:
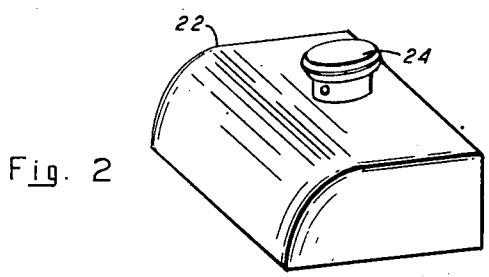
Figure 2 is a perspective view of the specimen compartment cover.
Figure 3:
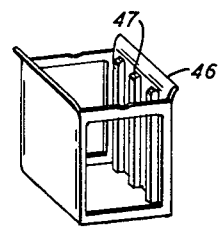
Figure 3 is a perspective view of an accessory for holding certain filters or liquid containers.

Referring to the drawings, the attachment comprises an oblong casing 12 having a side wall 13 from which extends a bottom platform 14 and a hinge member 15. A clamp 16, mounted on a stud 17 supported on the wall 13, extends to the platform 14. The clamp 16 may be removed from the stud 17 by means of the thumb nut 19. The casing 12 includes a compartment 20 which, as will be seen, houses the containers for the liquid, the density of which is to be measured. Next to the compartment 20 is another compartment 21 which is for the purpose of accommodating accessory elements. A cover 22, having a handle 24, fits over compartments 20 and 21 resting on the ledge formed by the casing walls and located by pins 23 and 25. A hinged cover 26 is affixed to the wall 13 and forms the top of the casing 12. Under this cover may be a large compartment or suitable smaller compartments for storing specimen samples and various other ancillary devices such as specimen parts, etc. A knob 27 is affixed to the cover 26 for lifting it over the hinges 28.

The compartment 20 is seen in Figure 6 in a cross-sectional view, and in Figure 8 in a top view for more comprehensive illustration. It will be observed that the bottom of the compartment has a cylindrical recess 29 which accommodates a test tube 30, illustrated in Figure 10. The side wall 13 has an aperture 31 which communicates with the compartment 20. Opposite this aperture, the side wall 32 of the compartment 20 accommodates a light source in the form of a miniature or pen light lamp 33 which is mounted in a socket 34 affixed to the side wall 32. The position of the light source 33 is in alignment with the aperture 31 so that the beam of light produced by the lamp will be directed through the aperture 31.

Referring to Figure 1, it is seen that the bottom platform 14, having a hinge receptacle 35, together with the hinge member 15 and its receptacle 36, is so constructed and dimensioned as to accommodate the phototube arm of the densitometer to which this attachment is an accessory. This arm, when removed from the densitometer, is hinged in the receptacles 35 and 36 and secured to the side wall 13 by means of the clamp 16. When so positioned, the phototube aperture in the densitometer arm will be in direct alignment with the aperture 31 in the side wall 13. Consequently, the light from the lamp 33 will be directed to the phototube located in the arm of the densitometer through the aperture 31. This light must pass through whatever specimen is placed in the compartment 20. This attachment may also be used with densitometers of other types as long as they are equipped with phototube probes which can be placed alongside the wall 13 opposite the aperture 31.

Figures 4, 5:
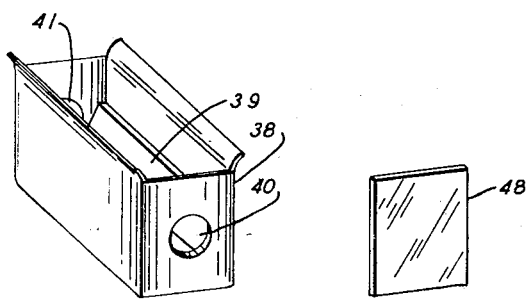
Figure 4 shows the form of a filter which may be inserted in the above holder.
Figure 5 is a perspective view of a holder for a cuvette for the liquid to be analyzed.

Accessory holders are provided for the purpose of accommodating liquid specimens in a simple and easily accessible manner. These accessories fit into the compartment and are so dimensioned that no adjustment of their placement is necessary to maintain light transmission through the liquid to be analyzed. One of the accessories most frequently used is seen in Figures 5 and 9 and comprises an oblong holder 38 which is open on top and has a trough 39 on the bottom thereof. Apertures 40 and 41 in the front and back end of the holder 38 are provided for alignment with the aperture 31 in the side wall 13 and for passing the light through the holder 38 from the lamp 33. The upper edge of both side walls of the holder 38 is flared out for easier manual handling. The trough 39 accommodates a cuvette 43, as seen in Figure 9 which has suitable inlet pipes 44 and 45 through which the liquid may be poured in, so that the entire cuvette may be filled without any air bubbles being trapped therewithin.

At times, it is necessary to utilize certain filters in connection with the color analysis of the optical density of liquids, and for this purpose, there is provided a frame 46 similar in shape to the holder 38. Inside the frame 46 there are ribs 47 spaced at intervals between which grooves are formed for slidably accommodating filters 48 of glass or other suitable material in the shape shown in Figure 4. Instead of the filters, this frame accessory may also be used for liquid vessels of suitable flat shape fitting the grooves.

The operation of the liquid density attachment is extremely simple in that when the densitometer arm is properly fastened to the side wall 13, a light-tight alignment is provided with the aperture 31. The specimen in whatever form it is to be used, is then placed in the compartment 20. This may be the holder 38 with the cuvette 43 therein alone, or together with the frame 46 accommodating the proper filters. The compartment 20 is so dimensioned longitudinally as to accommodate both the specimen holder 38 and the filter holder frame 46 if the latter is desired to be used in conjunction with the former. When the specimen is in the compartment 20, the cover 22 is replaced, which forms a light-tight enclosure of the compartment 20. The light from the lamp 33, energized from a suitable source not shown here, will pass through the specimen and actuate the phototube behind the aperture 31 in accordance with the transmission characteristics of the liquid specimen. For certain types of samples, for example, for quick checks of liquids which may be under preparation as to properties of color, etc., the test tube 30 may be used, placed in the recess 29 of the compartment 20 in a similar manner.

I claim:

1. Liquid density measuring attachment for use with densitometers provided with a detachable arm incorporating a photoelectric tube, said arm having an aperture for the entry of light, comprising a housing having walls defining a light sealed enclosure, a platform extending from one wall of said housing and hinge means thereon for attaching said arm, a compartment within said housing behind said wall and an aperture therethrough communicating with said compartment and in alignment with the aperture of said arm when attached, a cover for said compartment, a light source in said housing extending into said compartment opposite said wall defining said aperture, and accessories adapted to be placed in said compartment including holders for liquids, the density of which is to be measured.

2. Liquid density measuring attachment in accordance with claim 1, wherein the walls of said compartment define a bottom recess of cylindrical cross-section for accommodating a test tube.

3. Liquid density measuring attachment in accordance with claim 1, wherein said accessories include an oblong holder having a trough bottom and apertures in the end walls thereof one communicating with said light source and the other with said aperture in the wall of said chamber, said trough accommodating a cuvette containing said liquid.

References Cited in the file of this patent

UNITED STATES PATENTS

| | | |
|---|---|---|
| 1,938,544 | Schoenberg | Dec. 5, 1933 |
| 2,044,131 | Staege | June 16, 1936 |
| 2,048,554 | Kuder | July 21, 1936 |
| 2,311,101 | Tuttle et al. | Feb. 16, 1943 |
| 2,405,483 | Abrams | Aug. 6, 1946 |
| 2,406,716 | Sweet | Aug. 27, 1946 |
| 2,447,985 | Mass | Aug. 24, 1948 |
| 2,477,208 | Rouy | July 26, 1949 |

FOREIGN PATENTS

| | | |
|---|---|---|
| 552,398 | Great Britain | Apr. 6, 1943 |